(12) United States Patent
Tian et al.

(10) Patent No.: US 11,324,035 B2
(45) Date of Patent: May 3, 2022

(54) METHOD AND SYSTEM FOR DETERMINING TRANSMISSION PARAMETERS IN A WIRELESS LOCAL AREA NETWORK

(71) Applicants: IMEC vzw, Heverlee (BE); Universiteit Antwerpen, Antwerp (BE)

(72) Inventors: Le Tian, Heverlee (BE); Steven Latre, Heverlee (BE); Jeroen Famaey, Heverlee (BE)

(73) Assignees: IMEC vzw, Heverlee (BE); Universiteit Antwerpen, Antwerp (BE)

( * ) Notice: Subject to any disclaimer, the term of this patent is extended or adjusted under 35 U.S.C. 154(b) by 223 days.

(21) Appl. No.: 16/619,927

(22) PCT Filed: Jun. 18, 2018

(86) PCT No.: PCT/EP2018/066156
§ 371 (c)(1),
(2) Date: Dec. 5, 2019

(87) PCT Pub. No.: WO2018/229307
PCT Pub. Date: Dec. 20, 2018

(65) Prior Publication Data
US 2020/0187244 A1    Jun. 11, 2020

(30) Foreign Application Priority Data

Jun. 16, 2017 (EP) .................................... 17176514
Nov. 3, 2017 (EP) .................................... 17200019

(51) Int. Cl.
*H04W 88/10* (2009.01)
*H04W 74/00* (2009.01)
(Continued)

(52) U.S. Cl.
CPC ......... *H04W 74/002* (2013.01); *H04L 5/0092* (2013.01); *H04W 72/0446* (2013.01); *H04W 74/0816* (2013.01)

(58) Field of Classification Search
None
See application file for complete search history.

(56) References Cited

U.S. PATENT DOCUMENTS

2013/0148501 A1* 6/2013 He ...................... H04W 74/085
370/235
2013/0301496 A1* 11/2013 Nagaraj ............ H04W 52/0216
370/311

(Continued)

OTHER PUBLICATIONS

Extended European Search Report from European application No. 17176514.2 (filed Jun. 16, 2017), dated Nov. 29, 2017.

(Continued)

*Primary Examiner* — Brandon M Renner (57) ABSTRACT

The invention pertains to a method for determining transmission parameters in a wireless local area network operating under a restricted access window scheme, said wireless local area network comprising an access point and a plurality of stations, the method comprising at said access point: estimating (230) respective transmission intervals and next transmission times of said plurality of stations; and assigning (260) a subset of said plurality of stations to a restricted access window group on the basis of said estimated next transmission times. The invention also pertains to a computer program product comprising code means configured to cause a processor to carry out the method and an access point configured to carry out the method.

20 Claims, 9 Drawing Sheets

(51) Int. Cl.
  *H04L 5/00*  (2006.01)
  *H04W 72/04*  (2009.01)
  *H04W 74/08*  (2009.01)

(56) References Cited

U.S. PATENT DOCUMENTS

| | | | |
|---|---|---|---|
| 2013/0336245 A1 | 12/2013 | Fischer | |
| 2014/0071900 A1 | 3/2014 | Park | |
| 2015/0173015 A1* | 6/2015 | Lee | H04W 52/0216 370/311 |
| 2015/0334592 A1* | 11/2015 | Choi | H04W 52/0216 370/311 |
| 2016/0249378 A1* | 8/2016 | Zhou | H04W 72/1268 |
| 2016/0249383 A1* | 8/2016 | Kwon | H04W 72/042 |

OTHER PUBLICATIONS

International Search Report and Written Opinion from PCT application No. PCT/EP2018/066156 (filed Jun. 18, 2018), dated Oct. 2, 2018.

\* cited by examiner

Algorithm 1: Estimate transmission interval of station $s \in \mathcal{S}$ input : Station $s \in \mathcal{S}$, $t^s_{succ}[0]$, $t^s_{succ}[1]$, $\pi^s_{trans}[0]$, $\pi^s_{trans}[1]$, $t^s_{int}$, $t_c$, $\pi^s_b$, $\pi^s_{failed}$
output: $t^s_{int}$, $t^s_{next}$ 1. if $\pi^s_{trans}[0] == failed$ then
2. $\quad \pi^s_{failed} \leftarrow \pi^s_{failed} + 1$
3. $\quad t^s_{int} \leftarrow t_c - t^s_{succ}[0] + 2 \times \pi^s_{failed} - 1$
4. else if $\pi^s_{trans}[0] == success \wedge \pi^s_{trans}[1] == failed$ then
5. $\quad \pi^s_{failed} \leftarrow 0$
6. $\quad t^s_{int} \leftarrow t^s_{succ}[0] - t^s_{succ}[1]$
7. else
8. $\quad \pi^s_{failed} \leftarrow 0$
9. $\quad$ if $\pi^s_b = 1$ then
10. $\quad\quad t^s_{int} \leftarrow t^s_{succ}[0] - t^s_{succ}[1]$
11. $\quad$ else if $t^s_{int} > 1$ then
12. $\quad\quad t^s_{int} \leftarrow t^s_{int} - 1$
13. $\quad$ else if $\pi^s_b > 1/t^s_{int}$ then
14. $\quad\quad 1/t^s_{int} \leftarrow 1/t^s_{int} + 1$
15. $\quad$ else if $\pi^s_b < 1/t^s_{int}$ then
16. $\quad\quad 1/t^s_{int} \leftarrow 1/t^s_{int} - 1$
17. $t^s_{next} = t^s_{int} + t^s_{succ}[0]$

Algorithm 2: RAW parameter configuration for beacon interval $b$ input : $\sigma^r_{opt}, \pi^b_{max}, \mathcal{S}_{queue}, \forall s \in \mathcal{S}: t^s_{int}, t^s_{next}$ output: $\mathcal{S}_{queue}, \mathcal{R}^b, \forall r \in \mathcal{R}^b: t^r, \mathcal{S}^r$ 1   $\pi^b \leftarrow 0$ 2   for $s \in \mathcal{S}_{queue} \wedge t^s_{next} \leq t_c \wedge \pi^b < \pi^b_{max}$ do

3     $\mathcal{S}^b \leftarrow \mathcal{S}^b \cup \{s\}$

4     if $\pi^b + \max(1/t^s_{int}, 1) > \pi^b_{max}$ then

5       $t^s_{int} \leftarrow 1/(\pi^b_{max} - \pi^b)$

6       $\pi^b \leftarrow \pi^b_{max}$

7     else

8       $\pi^b \leftarrow \pi^b + \max(1/t^s_{int}, 1)$ 9   for $r \in \mathcal{R}^b$ do

`//` $\mathcal{S}^b$ `sorted by ascending AID`

10    for $s \in \mathcal{S}^b \wedge |\mathcal{S}^r| \leq \sigma^r_{opt}$ do

11      $\mathcal{S}^b \leftarrow \mathcal{S}^b \setminus \{s\}$ 12      $\mathcal{S}^r \leftarrow \mathcal{S}^r \cup \{s\}$ 13      $\pi^r \leftarrow \pi^r + \max(1/t^s_{int}, 1)$ 14    $t^r \leftarrow \pi^r \times t^b / \pi^b$

(a) Non cross slot boundary (b) Cross slot boundary

Fig. 7

(a) Station $s$ has packets in the transmission queue and informs the AP (b) Packet transmission spans two beacon intervals

Fig. 8

Algorithm 3: Transmission interval estimation of station $s$ input : $t_{succ}^s[0], t_{succ}^s[1], \pi_{trans}^s[0], \pi_{trans}^s[1], t_{int}^s, t_c, \pi_{b,r}^s, \pi_{failed}^s,$
$m_{succ}^s[0], m_{succ}^s[1], c_{succ}^s, \Delta_m^s$ output : $t_{int}^s, t_{next}^s$ 1. if $\pi_{trans}^s[0] == failed \wedge m_{succ}^s[0] == false$ then
2.     $\pi_{failed}^s \leftarrow \pi_{failed}^s + 1$
3.     $t_{int}^s \leftarrow t_c - t_{succ}^s[0] + 2 \times \pi_{failed}^s - 1$
4. else if $\pi_{trans}^s[0] == success \wedge \pi_{trans}^s[1] == failed$ then
5.     $\pi_{failed}^s \leftarrow 0$
6.     if $c_{succ}^s == true$ then
7.         $t_{succ}^s[0] - 1$
8.     $t_{int}^s \leftarrow t_{succ}^s[0] - t_{succ}^s[1]$
9. else if $\pi_b^s == 1$ then
10.     $\pi_{failed}^s \leftarrow 0$
11.     if $t_{int}^s > 1 \wedge m_{succ}^s[1] == true \wedge m_{succ}^s[0] == false$ then
12.         $t_{intMin}^s = max(t_{int}^s - 2 \times (\pi_{fail}^s - 1), \frac{\Delta_m^s}{\Delta_m^s + 2} \times t_{int}^s + 1)$
13.         $t_{intMax}^s = t_{int}^s - 1$
14.         $t_{int}^s = (t_{intMin}^s + t_{intMax}^s)/2$
15.     else if $t_{int}^s > 1$ then
16.         $t_{int}^s \leftarrow t_{succ}^s[0] - t_{succ}^s[1]$
17.     else if $c_{succ}^s == false \wedge m_{succ}^s[0] == false$ then
18.         $t_{int}^s \leftarrow 1$
19. else if $\pi_b^s > 1$ then
20.     $\pi_{failed}^s \leftarrow 0$
21.     if $t_{int}^s > 1$ then
22.         $t_{int}^s \leftarrow t_{int}^s - 1$
23.     else if $\pi_b^s > 1/t_{int}^s$ then
24.         $1/t_{int}^s \leftarrow 1/t_{int}^s + 1$
25.     else if $\pi_b^s < 1/t_{int}^s \wedge m_{succ}^s[0] == false$ then
26.         $1/t_{int}^s \leftarrow 1/t_{int}^s - 1$
27. $t_{next}^s = t_{int}^s + t_{succ}^s[0]$

Fig. 9

METHOD AND SYSTEM FOR DETERMINING TRANSMISSION PARAMETERS IN A WIRELESS LOCAL AREA NETWORK

FIELD OF THE INVENTION

The present invention pertains to the field of wireless local area networks, in particular in the context of an "Internet of Things" (IoT) setting or sensor networks.

BACKGROUND

Traditional Wireless LAN systems rely on a Carrier Sense Multiple Access/Collision Avoidance (CSMA/CA) scheme in combination with a coordination function (e.g., DCF, HCF, PCF) to allow multiple stations to share the common wireless medium. The stations are configured to sense whether the channel is busy, and to wait for the expiry of a back-off timer prior to transmitting if this is the case. If there is a collision, the back-off counter is increased and the counter is restarted.

While the known CSMA/CA scheme works adequately for typical wireless LAN installations, such as hot spots used by no more than a few tens of stations, it has turned out to scale poorly to installations with hundreds or even thousands of devices, as may be expected to arise in the emerging "Internet of Things" (IoT) context. As the probability of collision increases, the average duration of the back-off timers increases, which leads to a decrease of the throughput for the stations.

It has been proposed, as part of the IEEE 802.11ah Wi-Fi standard (marketed as Wi-Fi HaLow), to use a Restricted Access Window (RAW) scheme to overcome this decline in throughput. The RAW scheme aims to increase scalability in dense IoT networks, where a large amount of stations connect to a single access point (AP), by dividing stations into groups, limiting simultaneous channel access to one group and therefore reducing the collision probability for upstream traffic.

The IEEE 802.11ah standard does not specify the grouping strategy, which is responsible for deciding how to split stations among groups. To date, no grouping strategies have been published that perform adequately in view of dynamic and heterogeneous traffic conditions. Accordingly, there is a need for grouping strategies that allow WLAN networks to enjoy the full benefit of the scalability of the RAW scheme in deployments with high numbers of stations.

SUMMARY

According to an aspect of the present invention, there is provided a method for determining transmission parameters in a wireless local area network operating under a restricted access window scheme, said wireless local area network comprising an access point and a plurality of stations, the method comprising at said access point: estimating respective transmission intervals and next transmission times of said plurality of stations; and assigning a subset of said plurality of stations to a restricted access window group on the basis of said estimated next transmission times.

The present invention is based inter alia on the insight of the inventors that the optimal parameters for the RAW scheme depend on a wide range of network variables, such as number of stations, network load and traffic patterns, and that the WLAN network in an IoT context benefits from dynamic station grouping algorithms that determine the optimal station grouping parameters based on the current network and traffic conditions. It is an advantage of the method according to the present invention that the group duration and the station grouping parameters can be determined dynamically on the basis of information that is readily available in the access point. In particular, the method according to the present invention relies on information regarding successful and unsuccessful transmission attempts by particular stations to obtain an accurate transmission interval estimate (or, equivalently, a transmission rate estimate).

In an embodiment, the method of the present invention further comprises determining the number and the respective durations of slots in said restricted access window group.

It is an advantage of this embodiment that the slot-related parameters can be determined dynamically on the basis of information that is readily available in the access point. In particular, the method relies on information regarding successful and unsuccessful transmission attempts by particular stations to obtain an accurate transmission interval estimate (or, equivalently, a transmission rate estimate).

In an embodiment of the method according to the present invention, the estimating comprises incrementing a previous transmission interval estimate of a station if said station failed to use an assigned slot in an immediately preceding beacon interval.

In the assumption that most stations behave like sensor nodes in that they transmit data at a regular and predictable rate, the failure of a station to use an assigned slot may be indicative of an overestimation of the station's transmission rate (i.e., an underestimation of the transmission interval). It is an advantage of this embodiment that such an estimation error is corrected so as to arrive at an estimate that is closer to the actual value.

In a particular embodiment, said incrementing is performed according to a multiplicative-decrease scheme.

The inventors have found that a multiplicative-decrease scheme provides an appropriate balance between the risk of causing transmission buffer overflows at the station (due to underestimation of the transmission rate) and the risk of allocating bandwidth in a suboptimal manner (due to overestimation of the transmission rate).

In an embodiment of the method according to the present invention, said estimating further comprises setting a transmission interval estimate of a station to the time elapsed between two consecutive successful packet transmissions by said station if said station successfully used a first assigned slot in an immediately preceding beacon interval and failed to use a second assigned slot in a beacon interval preceding said immediately preceding beacon interval.

It is an advantage of this embodiment that it uses the most recent available information to estimate the transmission interval of a station, if the previous to last transmission slot assigned to that station was not successfully used.

In an embodiment of the method according to the present invention, said estimating further comprises setting a transmission interval estimate of a station to the time elapsed since the last successful transmission by said station, if said station successfully used a first assigned slot in an immediately preceding beacon interval to transmit a single packet and said station successfully used a second assigned slot in a beacon interval preceding said immediately preceding beacon interval.

It is an advantage of this embodiment that it increases slot utilization by setting the transmission interval estimate slightly higher than the observed interval for a station repeatedly transmitting successfully, where the last transmission included a single packet.

In an embodiment of the method according to the present invention, said estimating further comprises decrementing a previous value of a transmission interval estimate of a station if said station successfully used a first assigned slot in an immediately preceding beacon interval to transmit more than one packet and said station successfully used a second assigned slot in a beacon interval preceding said immediately preceding beacon interval and said previous value of said transmission interval estimate is greater than one beacon interval.

It is an advantage of this embodiment that it increases bandwidth allocated to a station repeatedly transmitting successfully, where the last transmission includes more than one packet.

In an embodiment of the method according to the present invention, said estimating further comprises decrementing a previous value of a transmission interval estimate of a station if said station successfully used a first assigned slot in an immediately preceding beacon interval to transmit at least two packets and said station successfully used a second assigned slot in a beacon interval preceding said immediately preceding beacon interval and said previous value of said transmission interval estimate is less than one beacon interval and the number of said at least two packets is greater than the number of packets expected on the basis of said previous value of said transmission interval estimate.

In an embodiment of the method according to the present invention, said estimating further comprises incrementing a previous value of a transmission interval estimate of a station if said station successfully used a first assigned slot in an immediately preceding beacon interval to transmit at least two packets and said station successfully used a second assigned slot in a beacon interval preceding said immediately preceding beacon interval and said previous value of said transmission interval estimate is less than one beacon interval and the number of said at least two packets is less than the number of packets expected on the basis of said previous value of said transmission interval estimate.

It is an advantage of these two embodiments that it provides a gradual adjustment of the transmission interval estimates for a station repeatedly transmitting successfully, whereby multiple packets are transmitted in a single slot.

In an embodiment of the method according to the present invention, the estimating comprises using respective values of the "more data" header field as advertised by the plurality of stations.

IEEE 802.11ah inherits the "more data" header field from the legacy IEEE 802.11 standard and further extends its application scope. An 802.11ah station can set the "more data" header field of the frame control field to 1 in individually addressed packets to indicate that it has packets queued for transmission to the AP. In the legacy 802.11 standard, the "more data" field can be only used in the contention free (CF) period of the Point Coordination Function (PCF) or PS (power save) mode. It is an advantage of this embodiment that the estimation of the transmission interval can be made more accurate by not only looking at packets that have been transmitted successfully, but also at the state of the queue of the stations that have just successfully transmitted a packet.

In a particular embodiment, a combination of an occurrence of a positive indication in a "more data" header field as advertised by a station from among said plurality of stations in a previous to last successful transmission packet, and a negative indication in a "more data" header field as advertised by said station in a last successful transmission packet, triggers a downward adjustment of a transmission interval estimate for said station.

In this embodiment, the presence of a further queued packet at the time of the next to last successful transmission (a "positive indication" or a "1" value in the "more data" header field is indicative of the presence of a further packet in the transmission queue), and the absence of a further queued packet at the time of the last successful transmission, is considered indicative of an overestimation of the transmission interval. It is an advantage of this embodiment that it uses the cited combination of advertisements as a trigger to adjust the estimate of the transmission interval, so as to avoid a detrimental build-up of packets in the transmission queue of the station in question.

In an embodiment of the method according to the present invention, assessments of failed or successful packet transmissions are adjusted to take into account cross slot boundary transmissions, such that a packet transmission spanning two beacon intervals is counted as successful in the earlier one of said two beacon intervals.

The cross slot boundary feature allows ongoing transmissions to continue after the end of the current RAW slot. This feature can cause a packet transmission to span two beacon intervals. As a consequence, traffic estimation, which is performed at the target beacon transmission time, will consider such a transmission as failed, while in reality it may succeed; i.e., without adequately taking into account the cross slot boundary feature, such a transmission would be treated as a failure at time $t_c-1$ but as a success at time $t_c$. It is an advantage of this embodiment that it can improve estimation accuracy by accounting for the incorrect information used at time $t_c-1$ and correcting it at time $t_c$.

According to an aspect of the present invention, there is provided a computer program product comprising code means configured to cause a processor to carry out the method as described above.

According to an aspect of the present invention, there is provided an access point configured to carry out the method as described above.

The technical effects and advantages of embodiments of the computer program product and the access point according to the present invention correspond, *mutatis mutandis*, to those of the corresponding embodiments of the method according to the present invention.

BRIEF DESCRIPTION OF THE FIGURES

These and other technical features and advantages of embodiments of the present invention will now be described with reference to the attached drawings, in which:

FIG. 9 presents an algorithm for estimating transmission intervals according to another embodiment of the present invention.

DESCRIPTION OF EMBODIMENTS

Figure 1:
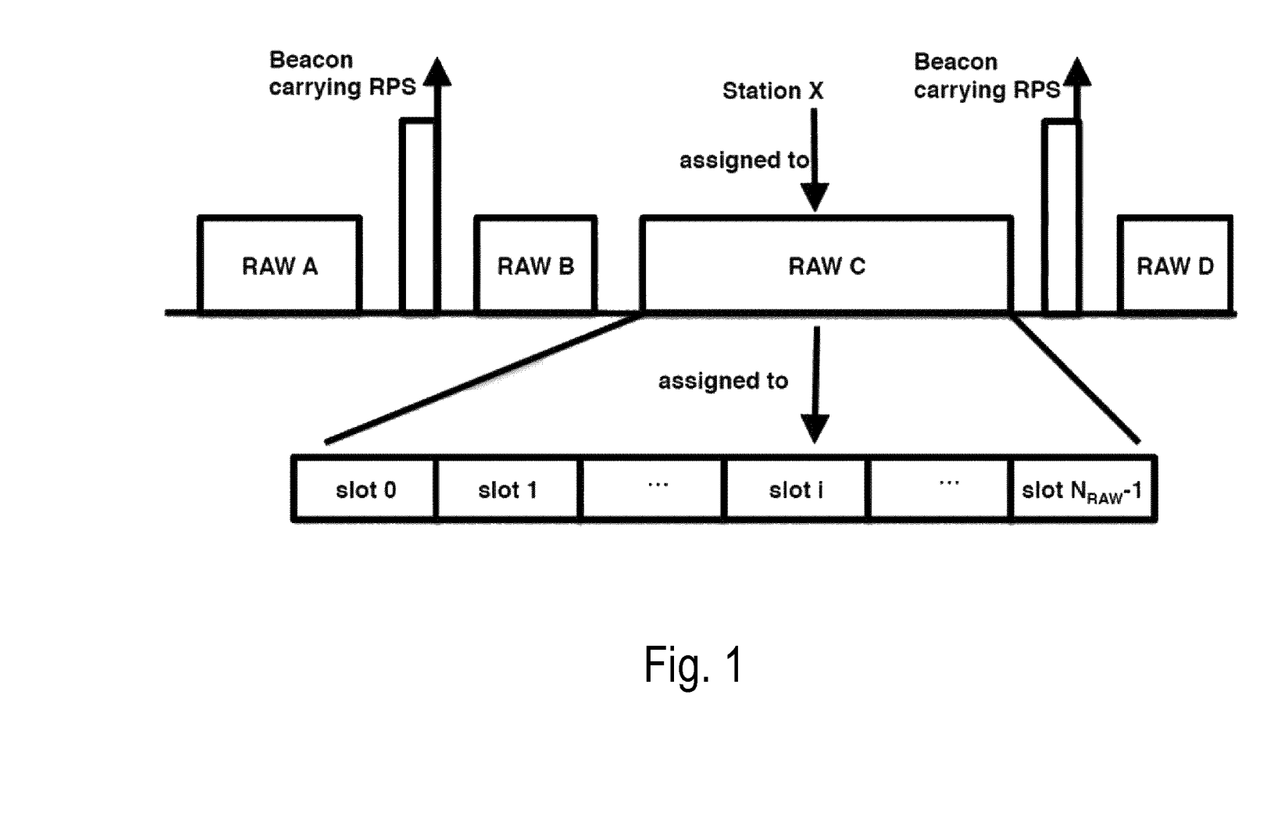
FIG. 1 presents a schematic representation of the RAW mechanism, with the beacon RPS element carrying information about the number of RAW groups, their duration, number of equal-sized slots, and assigned stations.

FIG. 1 presents a schematic representation of the RAW mechanism, with the beacon RPS element carrying information about the number of RAW groups, their duration, number of equal-sized slots, and assigned stations. The RAW mechanism aims to reduce collisions and improve performance in dense IoT networks where hundreds or even thousands of stations are simultaneously contending for channel access.

It restricts the number of stations that can simultaneously access the channel by dividing them into groups and only allowing stations that belong to a certain group to access the channel at specific times. Specifically, the airtime is divided into intervals, some of which are assigned to RAW groups, while the others are considered as shared channel airtime and can be accessed by all stations. Each interval assigned to a RAW group is preceded by a beacon that carries a RAW parameter set (RPS) information element that specifies the stations that belong to the group, as well as the interval start time. Moreover, each RAW interval consists of one or more slots, over which the stations in the RAW group are split evenly (using round-robin assignment). As such, the RPS also contains the number of slots, slot format and slot duration count sub-fields which jointly determine the RAW slot duration.

In a feature that distinguishes IEEE Std 802.11ah from previous WLAN standards, each station uses two back-off states of enhanced distributed channel access (EDCA) to manage transmission outside and inside their assigned RAW slot respectively. For the first back-off state, the station suspends its back-off timer at the start of each RAW, and restores and resumes the back-off timer at the end of the RAW. For the second back-off state, stations start back-off with initial back-off state inside their own RAW slot, and discard the back-off state at the end of their RAW slot, effectively restarting their back-off at the start of their next RAW period.

A beacon interval is the time between two beacon carrying RPS. The IEEE 802.11ah standard does not specify how to divide beacon intervals into RAW groups. However, the chosen division should be announced in the beacon message, and the number of RAW groups has an impact on the length of the beacon message. Concretely, the access point (AP) should implement a station grouping algorithm that determines the number of groups, time duration of each group, and how to divide stations among them. Embodiments of the present invention exploit the freedom to adapt parameters between consecutive beacon intervals in order to arrive at dynamic station grouping algorithms that determine the optimal station grouping parameters based on the current network and traffic conditions.

The inventors have found that it is advantageous to cluster stations and assign them to RAW groups by only using information readily available at the AP side. In view of that constraint, the objective is to maximize the performance (throughput, latency), by reducing channel contention. The parameters to be determined include (i) the number of RAW groups, (ii) the duration of each group, (iii) the number of (equal-sized) slots in each group, and (iv) the set of stations assigned to each group.

Figure 2:
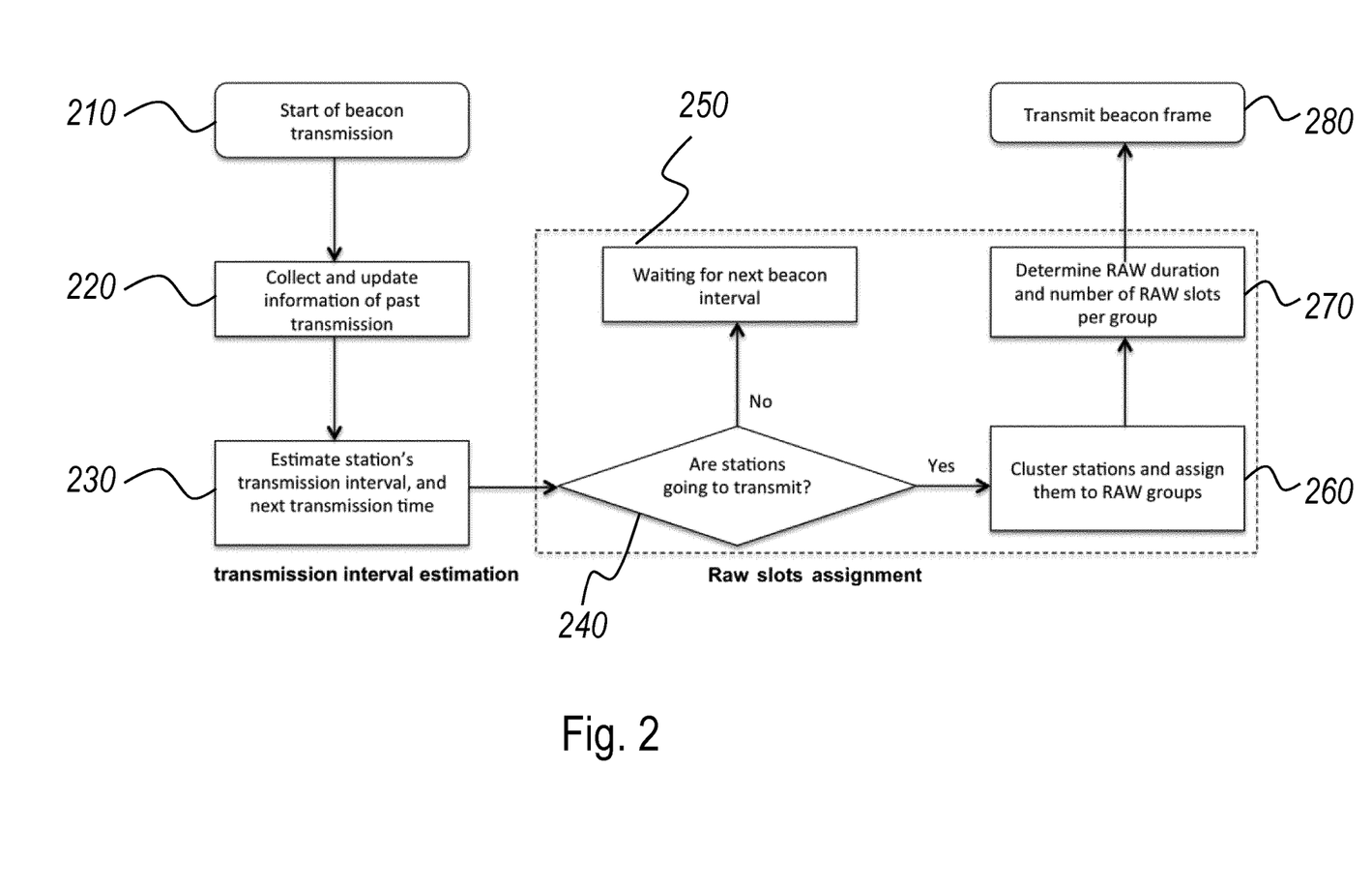
FIG. 2 schematically illustrates the steps of real-time stations grouping under dynamic traffic for IEEE 802.11ah according to an embodiment of the present invention.

The inventors have found that a set of variables that is highly relevant for the purpose of the aforementioned performance maximization consists of the transmission intervals of the stations in the network. Hence, as shown in FIG. 2, the operations to be carried out by the AP can be divided in a "transmission interval estimation" stage and a "RAW slots assignment" stage. Once the algorithm has determined the RAW parameters and assigned stations to RAW slots based on these parameters, the RAW parameters are transmitted to the stations by the AP in the RPS element of the beacon frame.

In the "transmission interval estimation" stage, which is initiated at the start of each target beacon transmission time (TBTT) 210, information about past transmissions is collected and updated 220. On the basis of this information, stations' transmission intervals and their next transmission time are estimated 230.

Embodiments of the present invention rely on a novel scheme for transmission interval estimation, with a view to determining the above mentioned parameters. Based on updated information of past transmissions, the packet transmission interval and the next transmission time of each station are estimated at step 230 in FIG. 2, as illustrated in more detail in the following exemplary algorithms.

Figure 4:
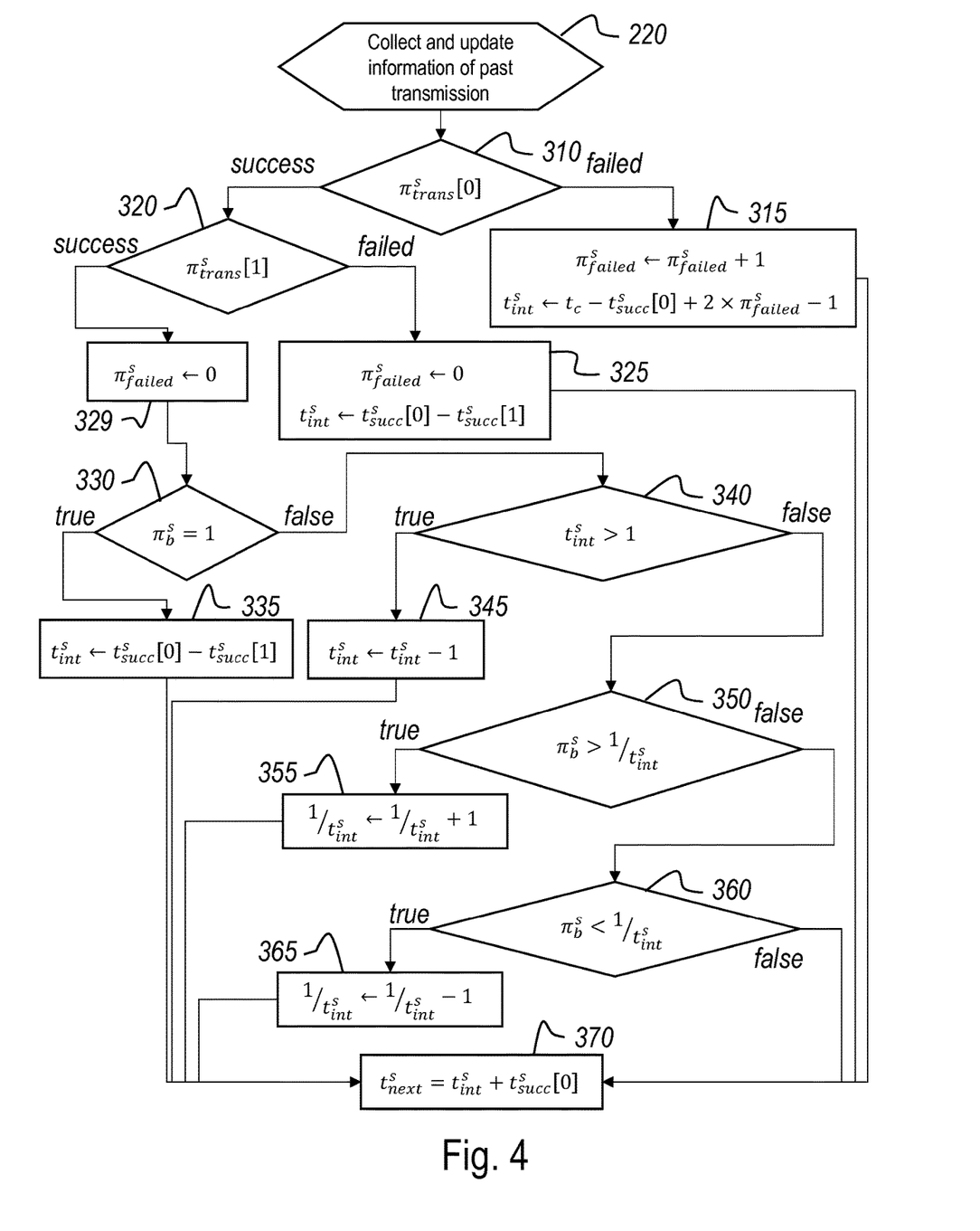
FIG. 4 provides a flow chart of the algorithm of FIG. 3.
Figure 5:
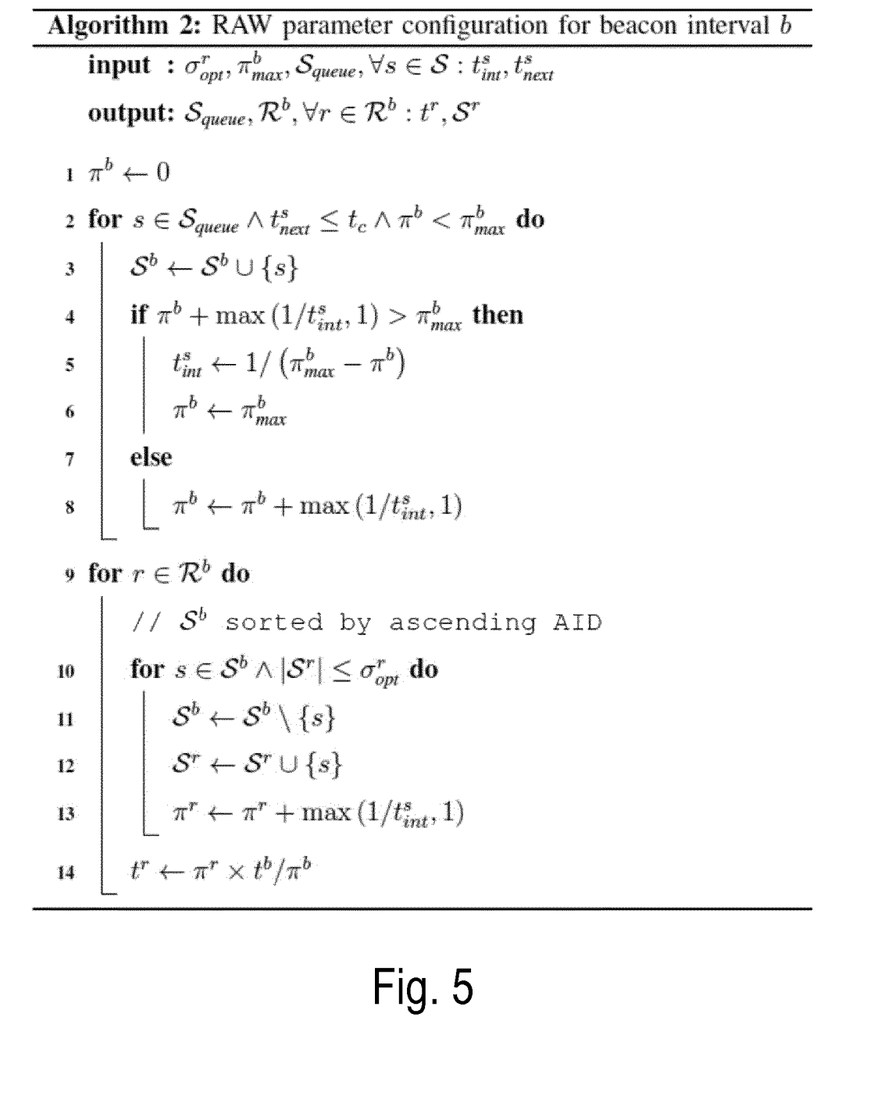
FIG. 5 presents an algorithm for assigning stations to RAW slots according to an embodiment of the present invention.

Aspects of the invention will first be described with reference to a first embodiment, also referred to as "TAROA", which uses the algorithm depicted in FIG. 3 and FIG. 4 for transmission interval estimation and the algorithm depicted in FIG. 5 for RAW parameter configuration.

The illustrated algorithm is based inter alia on the insight of the inventors that in an IoT context, many transmitters will be sensor stations, or act in a manner similar to sensor stations, which transmit packets with a certain (predictable) frequency. Hereinafter, line references (line x) will be used to refer to specific lines of the algorithm depicted in FIG. 3, and reference figures in bold type (3xx) will be used to refer to elements of the flow chart shown in FIG. 4.

In the remainder of this description, the estimated transmission interval of each station $s \in S$ will be noted as $t_{int}^s$. A station's transmission is regarded as successful if the AP received at least one packet from the station in the station's assigned RAW slot. If a station was assigned a RAW slot, but no packets were received by the AP during that slot, it is considered a failed transmission. The variables $\pi_{trans}^s[0]$ and $\pi_{trans}^s[1]$ are introduced to designate the last transmission result (success or failure) and the previous to last transmission result (success or failure), respectively.

Figure 3:
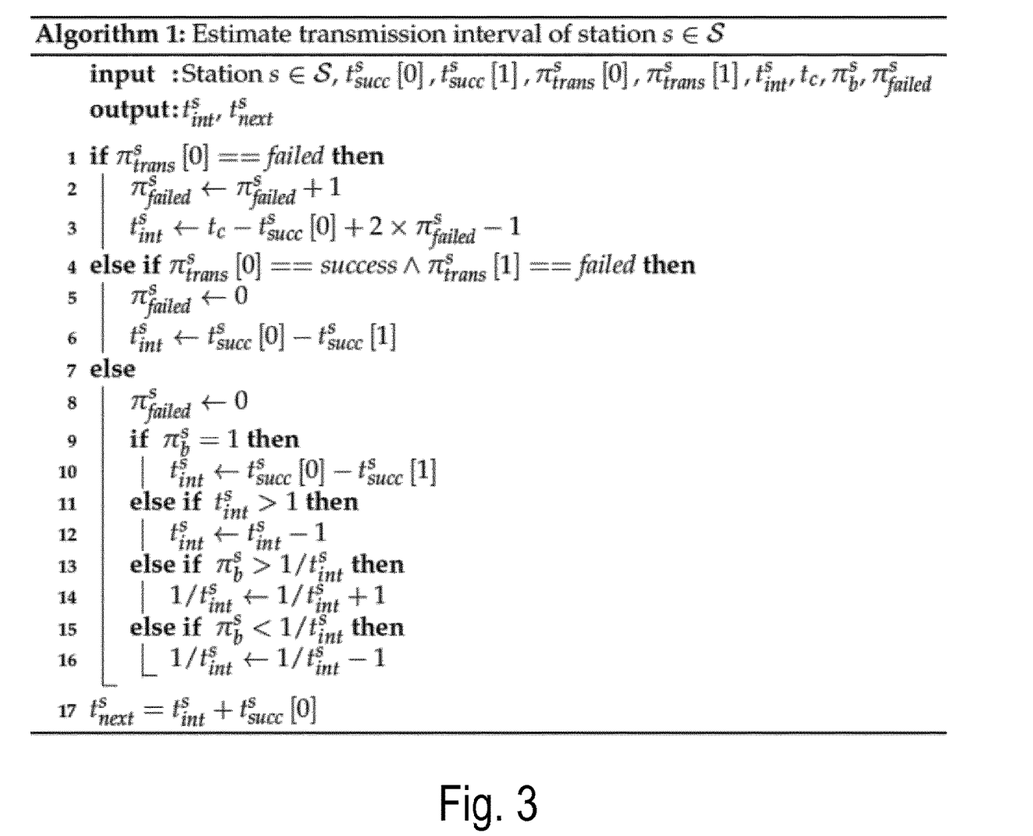
FIG. 3 presents an algorithm for estimating transmission intervals according to an embodiment of the present invention.

In the algorithm depicted in FIG. 3, $\pi_{trans}^s[0]$ and $\pi_{trans}^s[1]$ are used as decision factors to adjust the transmission interval estimate, depending on which one of the following three cases occurs:

a) the previous transmission failed $\pi_{trans}^s[0]$==failed; lines 1-3 of the algorithm depicted in FIG. 3);

b) the previous transmission was successful, but the one before failed ($\pi_{trans}^s[0]$==success and $\pi_{trans}^s[1]$==failure; lines 4-6 of the algorithm depicted in FIG. 3); or c) the last two transmissions were successful ($\pi_{trans}^s[0]$==success and $\pi_{trans}^s[1]$==success; lines 7-16 of the algorithm depicted in FIG. 3).

The motivation for using $\pi_{trans}^s[0]$ and $\pi_{trans}^s[0]$ as decision factors can be explained as follows.

If the previous transmission failed (310/failed, case (a) above), this can be assumed to imply that station s had no packets in its transmit queue, which means that the estimated transmission interval $t_{int}^s$ of station s is too short. Of course, this assumption relies on the assumption that the failure is not due to a collision, but that latter assumption is reasonable in view of the use of RAW, whose very purpose it is to minimize the probability of collisions. Hence, in this branch of the algorithm, the value of $t_{int}^s$, should be increased. The increase should be sufficiently gradual to avoid overestimation (in which case the station generates packets at a rate that exceeds the one represented by the estimated $t_{int}^s$, which could lead to loss of packets due to buffer overflow) and sufficiently steep to avoid repeated underestimation (in which case the station generates packets at a rate that is lower than the one represented by the estimated $t_{int}^s$, which would result in suboptimal use of the available bandwidth). The inventors have found that the use of a multiplicative-decrease scheme, as known from the TCP congestion control scheme, gives good results. Accordingly, $t_{int}^s$ is preferably increased by adding a term representing twice the number of consecutive failed transmissions to the time elapsed since the last successful transmission (expressed as the difference of the current time $t_c$ and the time of the last successful transmission of station s, $t_{succ}^s[0]$) minus 1 beacon interval 315. To enable this multiplicative-decrease scheme, the variable $\pi_{failed}^s$ is introduced to represent the present value of the number of consecutive failed transmissions: thus, $\pi_{failed}^s$ is increased by one when transmission fails (as is the case here) and reset to 0 once transmission succeeds (as in case (b) and case (c), discussed below).

If the previous transmission was successful (310/success), but the one before failed (320/failed, case (b) above), the failure counter $\pi_{failed}^s$ failed is reset to 0 and the transmission interval $t_{int}^s$ is estimated as the time difference between the last two successful transmissions (expressed here as the difference between the time of the last successful transmission $t_{succ}^s[0]$ and the previous to last successful transmission $t_{succ}^s[1]$), 325. This scenario can be interpreted as occurring when the estimate of the transmission interval $t_{int}^s$ has transitioned from an underestimation to an accurate value or an overestimation.

If the estimate of the transmission interval $t_{int}^s$ is fairly accurate (at most a small overestimation, i.e. the actual rate at which the station generates packets is higher than the one represented by the estimate of the transmission interval $t_{int}^s$), the system will arrive, after the beacon interval of case (b) above, at a situation where the previous transmission and the one before that were both successful (310/success+320/success, case (c) above). This case can be further divided in two possibilities:

If only one packet is received in this beacon interval 330/true (in other words, the number of packets $\pi_b^s=1$), $t_{int}^s$ is updated in the same way as in case (b) (335, line 10).

If s transmits multiple packets to the AP 330/false (in other words, $\pi_b^s>1$), a further distinction must be made as to whether $t_{int}^s>1$ or $t_{int}^s\leq 1$.

If $t_{int}^s$ is more than one beacon interval 340/false (i.e., $t_{int}^s>1$), the estimated transmission interval $t_{int}^s$ must be reduced. In the embodiment represented by FIG. 3, $t_{int}^s$ is reduced by 1 beacon interval (345, line 12).

If $t_{int}^s$ is less than one beacon interval (i.e., $t_{int}^s\leq 1$), there are two further possibilities:

If the number of received packets is higher than the estimated number of expected packets 350/true (i.e., $\pi_b^s>1/t_{int}^s$), the estimate of the transmission interval $t_{int}^s$ must be reduced. In the embodiment represented by FIG. 3, $t_{int}^s$ is reduced by adding 1 to the inverse (355, line 14).

If the number of received packets is lower than the estimated number of expected packets (i.e., $\pi_b^s<1/t_{int}^s$ the estimate of the transmission interval $t_{int}^s$ must be increased. In the embodiment represented by FIG. 3, $t_{int}^s$ is increased by subtracting 1 from the inverse (365, line 16).

Finally, the next transmission time $t_{next}^s$ is calculated as the last successful transmission plus the newly estimated transmission interval (370, line 17). As the algorithm is iterative, the estimate of $t_{int}^s$ will become more accurate as more information about successful and failed transmissions becomes available.

It may be noted that while the method described above is extremely well suited to deal with dynamically changing transmission conditions, it does not lead to a strict convergence of the transmission interval estimates for stations that have a perfectly regular transmission rate. Instead, the estimates will oscillate between over- and underestimations, in such a way that the deviations at any given time are small enough not to impact the overall efficiency of the scheme in a significant way.

If, based on the above estimates $t_{int}^s$, a station is not expected to transmit 240, the system preferably postpones assigning a RAW slot to that station 250 until the next beacon interval.

Based on the above estimates $t_{int}^s$, the set of stations $\mathcal{S}^r$ that have pending packets are assigned to RAW groups 260 to allow them to access the channel. Subsequently, the set of RAW slots $\mathcal{R}_b$ to initialize in the next beacon interval b, as well as the duration $t^r$ of each of the RAW slots, are determined 270. These RAW parameters are selected based on the previously determined estimation of the transmission interval $t_{int}^s$ and next transmission time $t_{next}^s$. As shown in FIG. 5, this is a two-step process:

(i) select a subset of stations with pending packets to be assigned a RAW slot during the upcoming beacon interval (lines 2-8), and (ii) partition the selected stations among the available number of RAW slots and determine the slot durations (lines 9-14).

In the first part (lines 2-8), the algorithm iterates over all stations s, according to ascending last successful transmission time $t_{succ}^s[0]$ (i.e., $\mathcal{S}_{queue}$) until the next station has a next estimated transmission time greater than the current time (i.e., $t_{next}^s>t_c$) or the maximum allowed number of packet transmissions has been reached (i.e., $\pi^b\geq\pi_{max}^b$) (line 2). The station is first added to the set of stations allowed to transmit during the beacon interval $\mathcal{S}^b$ (line 3). Then, if the station is estimated to transmit more than 1 packet per beacon interval (i.e., $t_{int}^s<1$) and its estimated number of transmissions plus $\pi^b$ will exceed the maximum packet transmissions in b (line 4), then it is allowed to transmit part of its packets and its estimated transmission interval is updated accordingly (line 5), and $\pi^b$ equals to $\pi_{max}^b$ (line 6). Otherwise, the station is expected to be able to transmit all of its packets and $\pi^b$ is increased with the number of packets s it is estimated to transmit in the beacon interval (line 8).

All slots within a RAW group have the same duration and only stations with sequential AIDs can be assigned to the same group. The optimal duration of a slot depends on the number of stations assigned to it, as well as their data rates, number of queued packets, and packet payload sizes. The inventors have found that by limiting the method to cases where each RAW group has exactly 1 slot, and allowing all slots to have a different size, the loss of optimality caused by selecting a worst-case slot duration can be avoided.

In the second part (lines 9-14), stations are assigned to RAW slots $r \in \mathcal{R}_b$ according to increasing AID (as only sequential AIDs can be assigned to the same group) until the number of stations assigned to the slot are greater or equal to the optimal number of assigned stations (i.e., $|\mathcal{S}^r| > \sigma_{opt}^r$) (line 10). The skilled person will be able to determine an appropriate value of $\sigma_{opt}^r$ by routine experimentation or analytical methods.

The number of packets to be transmitted by s is added to the expected number of packet transmissions in r (line 13). Finally, the optimal duration $t^r$ of the slot is determined based on the number of expected packet transmission $\pi^r$ (line 14).

Upon conclusion of the previous steps 260, 270, the beacon frame containing the necessary RAW group and slot information may be transmitted 280 to the network.

Embodiments of the method according to the present invention may be implemented in dedicated hardware (e.g., ASIC), configurable hardware (e.g., FPGA), programmable components (e.g., a DSP or general purpose processor with appropriate software), or any combination thereof. The same component(s) may also include other functions. Accordingly, the present invention also pertains to a computer program product, preferably in the form of a computer readable medium, comprising code means configured to cause a processor to carry out the method as described above.

Figure 6:
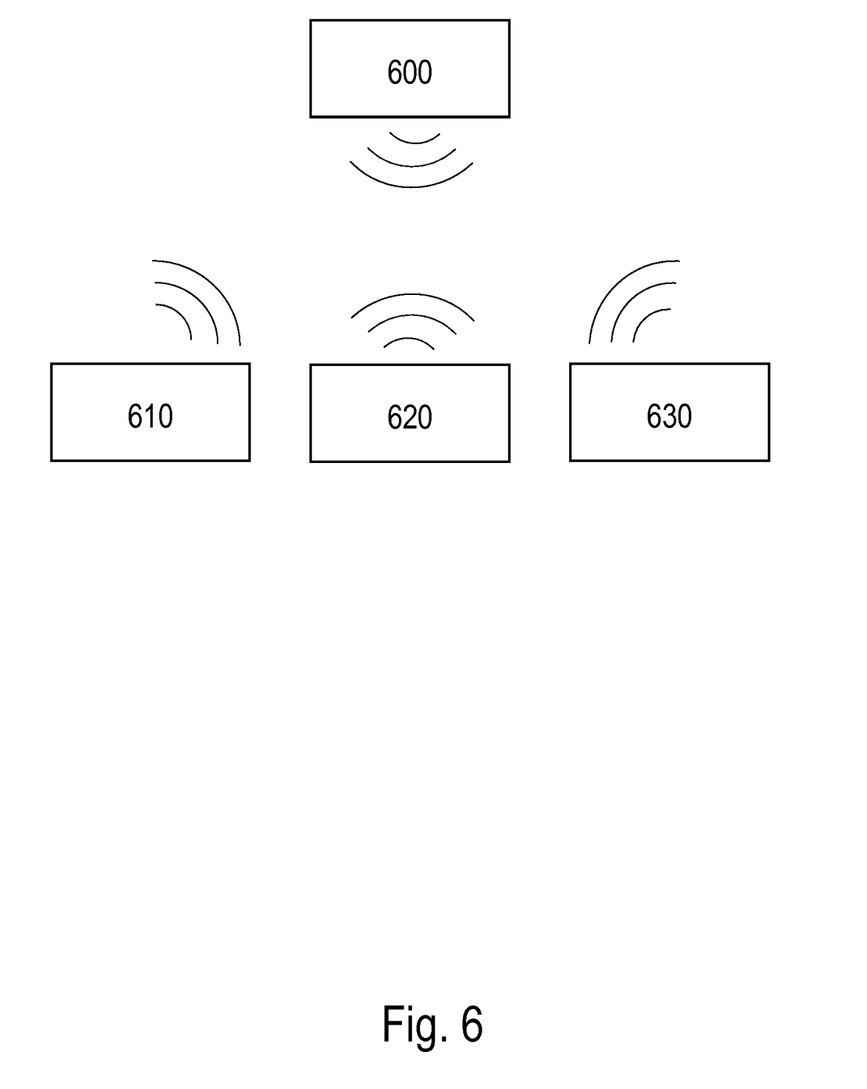
FIG. 6 schematically illustrates a wireless access network in which the present invention may be deployed.

With reference to FIG. 6, the present invention also pertains to an access point 600 configured to carry out the method as described above. Without loss of generality, the access point 600 is shown in communication with three stations 610, 620, 630.

As explained above, optimizing the RAW parameters strongly relies on accurate estimation of the interval $\hat{t}_{int}^s$ for each station s. However, the aforementioned embodiments do not fully utilize all the information available in the IEEE 802.11ah packet header, which could provide more insights into the station's traffic pattern. Therefore, further optional aspects of the present invention will now be described with reference to a second embodiment, which provides more accurate traffic estimation by exploiting the "More Data" header field and/or cross slot boundary feature. We refer to this embodiment as "E-TAROA".

The first step of E-TAROA (traffic estimation) is significantly different from the TAROA embodiment described above, and will be described in more detail with reference to FIGS. 7-9. The second step (RAW parameter optimization) of E-TAROA is nearly identical to the one of the TAROA embodiment, with the possible exception that E-TAROA allows stations with queued packets, but an estimated next transmission time greater than the time of the next beacon, to transmit, while the embodiment described above did not necessarily consider their buffer and would not schedule them for transmission.

Figure 7:
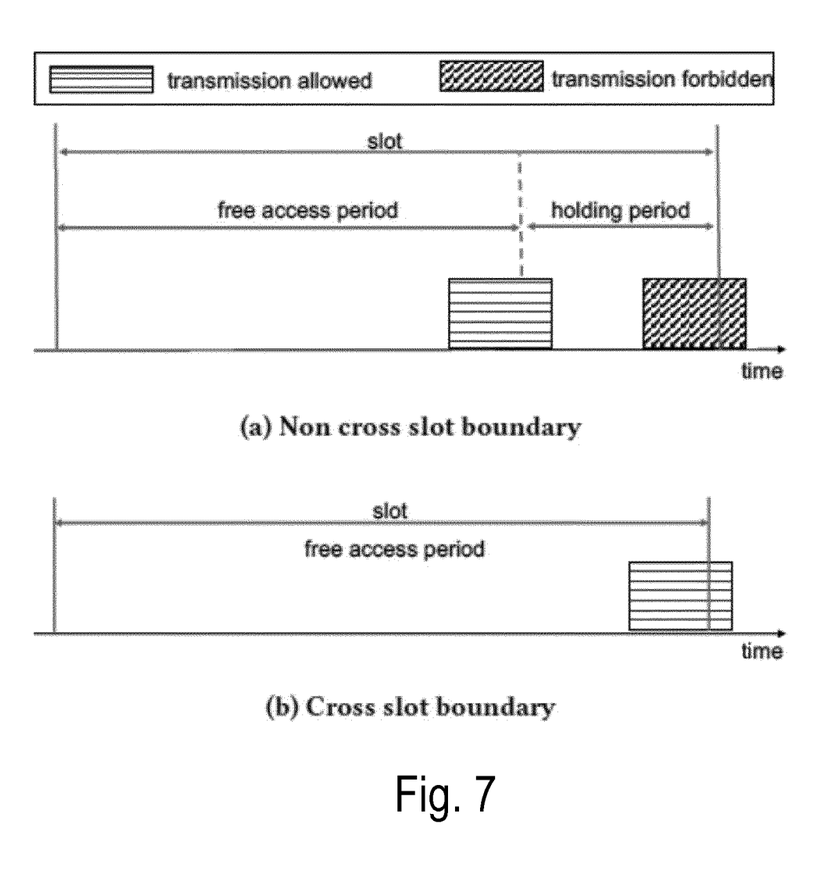
FIG. 7 illustrates the cross slot boundary feature of the IEEE 802.11ah standard.

The E-TAROA embodiment preferably takes advantage of the cross slot boundary feature of the IEEE 802.11ah standard (the RPS also contains the cross slot boundary (CSB) sub-field), which is illustrated in FIG. 7. As FIG. 7 depicts, stations are allowed to continue their ongoing transmissions even after the end of the current RAW slot when CSB is set to true. Otherwise, stations should not start a transmission if the remaining time in the current RAW slot is not enough to complete it. The remaining time, termed as "holding time", should be at least equal to the TXOP of the station. Several holding schemes are known from literature that specify how the station should count its back-off within the holding period.

In particular, in the E-TAROA embodiment, assessments of failed or successful packet transmissions are adjusted to take into account cross slot boundary transmissions, such that a packet transmission spanning two beacon intervals is counted as successful in the earlier one of said two beacon intervals. It is an advantage of this embodiment that it can improve estimation accuracy by accounting for the incorrect information used at time $t_c-1$ and correcting it at time $t_c$.

Figure 8:
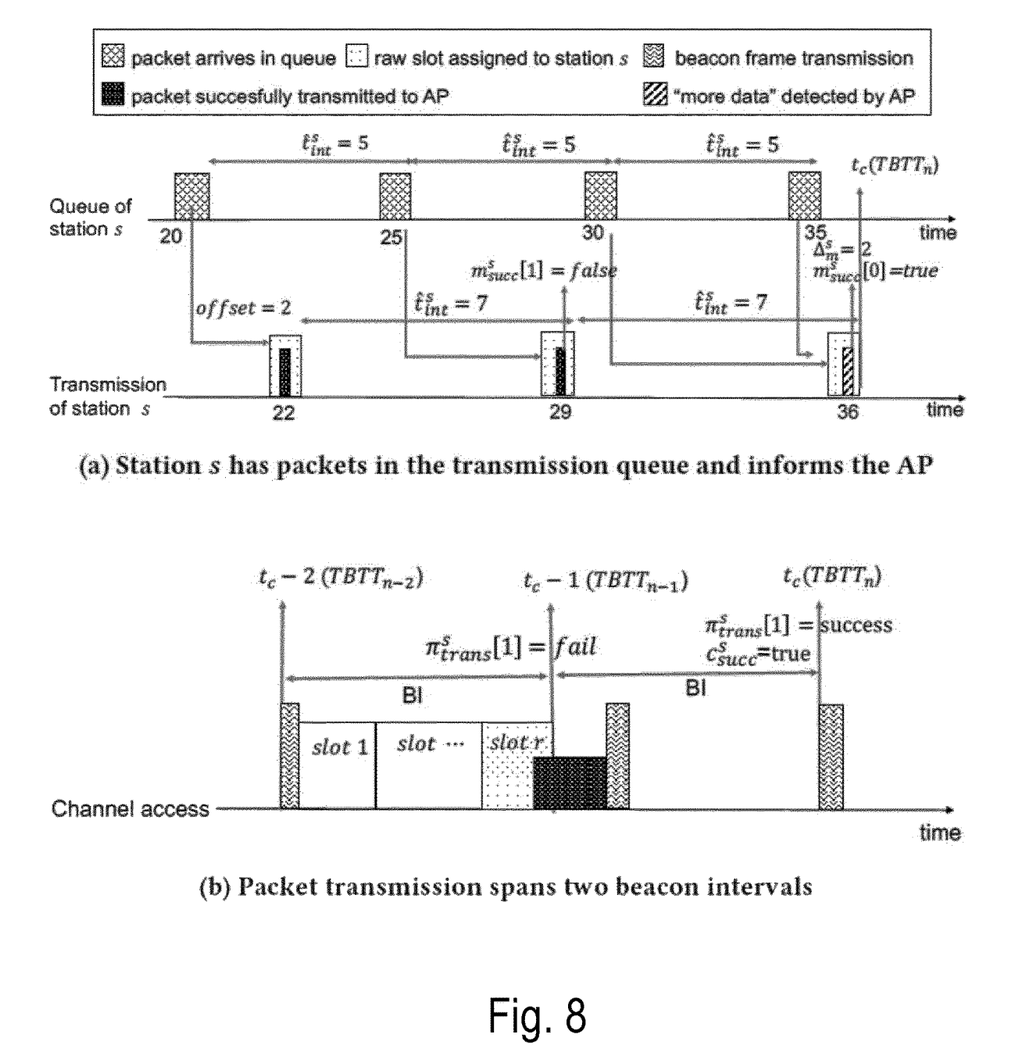
FIG. 8 illustrates the parameters used for estimating the transmission interval of station s at time $t_c$.

FIG. 8 illustrates the parameters used for estimating the transmission interval of station s at time $t_c$ in the E-TAROA embodiment. FIG. 8a depicts an example of a station notifying the AP that it has more packets in its queue using the "more data" header field. It shows, when the estimated traffic interval $t_{int}^s$ (i.e., 7 in the example) of station s is larger than the real transmission interval $\hat{t}_{int}^s$ (i.e., 5 in the example), there is one packet buffered at station s after $\Delta_m^s$ times transmission. In this case, the real transmission interval $\hat{t}_{int}^s$ satisfies the following conditions:

$$\begin{cases} (t_{int}^s - \hat{t}_{int}^s) \times \Delta_m^s + \text{offset} \geq \hat{t}_{int}^s \\ (t_{int}^s - \hat{t}_{int}^s) \times \Delta_m^s + \text{offset} < \hat{t}_{int}^s \times 2 \end{cases} \quad \text{(Eq. 1)}$$

where offset means, right offset beacon intervals before $t_{int}^s$ is calculated for the first time, a packet arrives in the transmission queue.

The value of offset ranges from 0 to $\hat{t}_{int}^s - 1$. Therefore, by using the "more data" header field, the estimated lower and upper bound of the real transmission interval $\hat{t}_{int}^s$ can be represented as:

$$\begin{cases} t_{intMin}^{s,m} = \frac{\Delta_m^s}{\Delta_m^s + 2} \times t_{int}^s + 1 \\ t_{intMax}^{s,m} = t_{int}^s - 1 \end{cases} \quad \text{(Eq. 2)}$$

The cross slot boundary feature allows ongoing transmissions to continue after the end of the current RAW slot. This feature can cause a packet transmission to span two beacon intervals. As a consequence, traffic estimation, which is performed at the TBTT, will consider such a transmission as failed, while in reality it may succeed. An example of this is depicted in FIG. 8b. TAROA considers the transmission a failure at time $t_c-1$ but a success at time $t_c$. E-TAROA improves estimation accuracy by accounting for the incorrect information used at time $t_c-1$ and correcting it at time $t_c$.

In the E-TAROA embodiment the estimating of the transmission intervals comprises using respective values of the "more data" header field as advertised by the plurality of stations. Preferably, a combination of an occurrence of a positive indication in a "more data" header field as advertised by a station from among said plurality of stations in a previous to last successful transmission packet, and a negative indication in a "more data" header field as advertised by said station in a last successful transmission packet, triggers a downward adjustment of a transmission interval estimate for said station.

The E-TAROA embodiment thus uses a different algorithm for estimating transmission intervals, a specific example of which is shown in Algorithm 3 of FIG. 9.

The goal of sensor traffic estimation is to determine the estimated transmission interval $t_{int}^s$ (i.e., the time between the generation of two subsequent packets) and next transmission time $t_{next}^s$ for each station s. As shown in Algorithm 3, they are estimated based on successful and failed transmissions during the previous beacon interval. A station's transmission is regarded as successful if the AP received at least one packet from the station. When only one packet from a station was received, and the station was not assigned to a RAW slot, the AP assumes the transmission crossed two beacon intervals. By using the "more data" field, a successful transmission can further indicate whether the station has more packets in its queue or not. If a station was assigned a RAW slot, but no packets were received by the AP, it is considered a failed transmission. The algorithm consists of four main blocks: (i) the previous transmission failed (lines 1-3), (ii) the previous transmission was successful, but the one before failed (lines 4-8), (iii) the last two transmissions were successful, and only one packet was received in the previous beacon interval (lines 9-18), and (iv) the last two transmissions were successful, and more than one packet was received in the beacon interval (lines 19-26).

In the first case (lines 1-3), if the previous successful transmission did not indicate station s had packets queued to send, and the previous transmission failed, the transmission failure counter $\pi_{failed}^s$ is increased by 1, and $t_{int}^s$ is increased by the number of subsequent failed transmissions multiplied by two. The transmission failure can be caused by a collision or the lack of packets in the station's transmission queue (i.e. no packets arrived in the transmission queue since the previous successful transmission). As RAW aims to minimize collisions, by properly grouping the stations into RAW slots, we assume the probability of transmission failure caused by collision is low enough to be ignored. Thus, the estimated transmission interval $t_{int}^s$ of station s is considered too short. As shown in Line 3, as the number of sequential failed transmission attempts increases, the algorithm assumes its estimation is more wrong and it will increase the interval faster. As such, the transmission interval can be overestimated up to $2\times(\pi_{fail}^s-1)$ beacon intervals. The first case also implies that if the failed transmission was caused by collision (i.e., the station had buffered packets to send but the previous transmission failed), $t_{int}^s$ remains unchanged.

In the second case (lines 4-8), the failure counter $\pi_{failed}^s$ is set to 0 and the transmission interval is estimated as the time difference between the last two successful transmissions, i.e. $t_{succ}^s[0]$ and $t_{succ}^s[1]$. If the previous successful transmission crosses two beacon intervals, $t_{succ}^s[0]$ is decreased by one beacon interval.

If an accurate $t_{int}^s$ is obtained in case 2, the next transmission will succeed and lead to case 3 (lines 9-18) or case 4 (lines 19-26) in which the two last transmissions are successful. In case 3, only 1 packet was received in the previous beacon interval. In both cases 3.1 (lines 11-14) and 3.2 (lines 15-16), $t_{int}^s$ is larger than one. For case 3.1, the transmission queue had no packets at the time of the last successful transmission but had packets at the time of previous to last successful transmission. This means the transmission interval was overestimated, and after $\Delta_m^s$ times transmission, this overestimation results in one buffered packet in the transmission queue at the time of the previous to last successful transmission. The estimated lower bound of the real transmission interval is updated as the maximum of the lower bound depicted in Eq. 2, and $t_{int}^s-2\times(\pi_{fail}^s-1)$. The latter means the transmission interval is overestimated by up to $2\times(\pi_{fail}^s-1)$ beacon intervals in case 1 (line 3). The upper bound is updated by using Eq. 2. The value of $t_{int}^s$ is set to the average of the two bounds. Case 3.2 covers all the remaining conditions, $t_{int}^s$ is updated in the same way as in case 2 (lines 15-16). Case 3.3 (lines 17-18) represents the inverse of case 3.1 and 3.2, where $t_{int}^s$ is equal to or smaller than 1 (i.e., the station is estimated to generate 1 or more than 1 packet per beacon interval). If the previous successful transmission did not cross two beacon intervals and the transmission queue is empty, $t_{int}^s$ becomes 1, otherwise, $t_{int}^s$ remains unchanged.

In case 4 (lines 19-26), more than 1 packet was received. In case 4.1 (lines 21-22), $t_{int}^s$ is larger than 1 (i.e., only 1 packet was allowed to be transmitted in the previous beacon interval), the overestimated $t_{int}^s$ is reduced by 1 beacon interval. In case 4.2 (lines 23-24), the number of received packets is higher than the estimated number of expected packets (i.e., $1/t_{int}^s$), the transmission interval is reduced by adding 1 to the inverse. Case 4.3 (lines 25-26) represents fewer packets are received than estimated and the transmission queue has no buffered packets. The transmission interval is increased by subtracting 1 from the inverse.

Finally, the next transmission time is calculated as the last successful transmission plus the newly estimated transmission interval (line 27). In essence, the algorithm is iterative, and as more information about successful and failed transmissions becomes available, the estimate of $t_{int}^s$ will become more accurate.

While the invention has been described hereinabove with reference to specific embodiments, this was done to clarify and not to limit the invention, the scope of which is to be determined by reference to the attached claims.

The invention claimed is:

1. A method for determining transmission parameters in a wireless local area network operating under a restricted access window scheme, said wireless local area network comprising an access point and a plurality of stations, the method comprising at said access point:
   estimating respective transmission intervals and next transmission times of said plurality of stations, wherein said estimating comprises setting a transmission interval estimate of a station of the plurality of stations to a time elapsed between two consecutive successful packet transmissions by said station in response to said station having successfully used a first assigned slot in an immediately preceding beacon interval and having failed to use a second assigned slot in a beacon interval preceding said immediately preceding beacon interval; and
   assigning a subset of said plurality of stations to a restricted access window group on the basis of said estimated next transmission times.

2. The method according to claim 1, further comprising determining a number of slots in said restricted access window group and respective durations of slots in said restricted access window group.

3. The method according to claim 1, wherein said estimating comprises incrementing a previous transmission interval estimate of a station of the plurality of stations in response to said station failing to use an assigned slot in an immediately preceding beacon interval.

4. The method according to claim 3, wherein said incrementing is performed according to a multiplicative-decrease scheme.

5. The method according to claim 1, wherein said estimating further comprises setting a transmission interval estimate of a station of the plurality of stations to a time elapsed since a last successful transmission by said station in response to said station having successfully used a first assigned slot in an immediately preceding beacon interval to transmit a single packet and said station having successfully used a second assigned slot in a beacon interval preceding said immediately preceding beacon interval.

6. The method according to claim 1, wherein said estimating further comprises decrementing a previous value of a transmission interval estimate of a station of the plurality of stations in response to (a) said station having successfully used a first assigned slot in an immediately preceding beacon interval to transmit more than one packet, (b) said station having successfully used a second assigned slot in a beacon interval preceding said immediately preceding beacon interval, and (c) said previous value of said transmission interval estimate having been greater than one beacon interval.

7. The method according to claim 1, wherein said estimating further comprises decrementing a previous value of a transmission interval estimate of a station of the plurality of stations in response to (a) said station having successfully used a first assigned slot in an immediately preceding beacon interval to transmit at least two packets, (b) said station having successfully used a second assigned slot in a beacon interval preceding said immediately preceding beacon interval, (c) said previous value of said transmission interval estimate having been less than one beacon interval, and (d) a number of said at least two packets having been greater than a number of packets expected based on said previous value of said transmission interval estimate.

8. The method according to claim 1, wherein said estimating further comprises incrementing a previous value of a transmission interval estimate of a station of the plurality of stations in response to (a) said station having successfully used a first assigned slot in an immediately preceding beacon interval to transmit at least two packets, (b) said station having successfully used a second assigned slot in a beacon interval preceding said immediately preceding beacon interval, (c) said previous value of said transmission interval estimate having been less than one beacon interval, and (d) a number of said at least two packets having been less than a number of packets expected based on said previous value of said transmission interval estimate.

9. The method according to claim 1, wherein said estimating further comprises using respective values of "more data" header fields as advertised by said plurality of stations.

10. The method according to claim 9, wherein a combination of an occurrence of a positive indication in a first "more data" header field as advertised by a station from among said plurality of stations in a previous to last successful transmission packet, and a negative indication in a second "more data" header field as advertised by said station in a last successful transmission packet, triggers a downward adjustment of a transmission interval estimate for said station.

11. The method according to claim 1, wherein assessments of failed or successful packet transmissions are adjusted to take into account cross slot boundary transmissions, such that a packet transmission spanning two beacon intervals is counted as successful in an earlier one of said two beacon intervals.

12. The method according to claim 2, wherein said estimating comprises incrementing a previous transmission interval estimate of a station of the plurality of stations in response to said station failing to use an assigned slot in an immediately preceding beacon interval.

13. The method according to claim 12, wherein said incrementing is performed according to a multiplicative-decrease scheme.

14. The method according to claim 2, wherein said estimating further comprises setting a transmission interval estimate of a station of the plurality of stations to a time elapsed since a last successful transmission by said station in response to said station having successfully used a first assigned slot in an immediately preceding beacon interval to transmit a single packet and said station having successfully used a second assigned slot in a beacon interval preceding said immediately preceding beacon interval.

15. The method according to claim 2, wherein said estimating further comprises decrementing a previous value of a transmission interval estimate of a station of the plurality of stations in response to (a) said station having successfully used a first assigned slot in an immediately preceding beacon interval to transmit more than one packet, (b) said station having successfully used a second assigned slot in a beacon interval preceding said immediately preceding beacon interval, and (c) said previous value of said transmission interval estimate having been greater than one beacon interval.

16. The method according to claim 2, wherein said estimating further comprises decrementing a previous value of a transmission interval estimate of a station of the plurality of stations in response to (a) said station having successfully used a first assigned slot in an immediately preceding beacon interval to transmit at least two packets, (b) said station having successfully used a second assigned slot in a beacon interval preceding said immediately preceding beacon interval, (c) said previous value of said transmission interval estimate having been less than one beacon interval, and (d) a number of said at least two packets having been greater than a number of packets expected based on said previous value of said transmission interval estimate.

17. The method according to claim 2, wherein said estimating further comprises incrementing a previous value of a transmission interval estimate of a station of the plurality of stations in response to (a) said station having successfully used a first assigned slot in an immediately preceding beacon interval to transmit at least two packets, (b) said station having successfully used a second assigned slot in a beacon interval preceding said immediately preceding beacon interval, (c) said previous value of said transmission interval estimate having been less than one beacon interval, and (d) a number of said at least two packets having been less than a number of packets expected based on said previous value of said transmission interval estimate.

18. The method according to claim 2, wherein assessments of failed or successful packet transmissions are adjusted to take into account cross slot boundary transmissions, such that a packet transmission spanning two beacon intervals is counted as successful in an earlier one of said two beacon intervals.

19. A non-transitory computer program product comprising code means configured to cause a processor to carry out the method according to claim 1.

20. An access point for determining transmission parameters in a wireless local area network operating under a restricted access window scheme, said wireless local area network comprising the access point and a plurality of stations, the access point comprising a processor configured to:
estimate respective transmission intervals and next transmission times of said plurality of stations, wherein said estimating comprises setting a transmission interval estimate of a station of the plurality of stations to a time elapsed between two consecutive successful packet transmissions by said station in response to said station having successfully used a first assigned slot in an immediately preceding beacon interval and having failed to use a second assigned slot in a beacon interval preceding said immediately preceding beacon interval; and assign a subset of said plurality of stations to a restricted access window group on the basis of said estimated next transmission times.

* * * * *